(12) United States Patent
De Ayguavives et al.

(10) Patent No.: US 7,452,076 B2
(45) Date of Patent: *Nov. 18, 2008

(54) COLLECTION OF OPHTHALMIC LENS PAIRS AND OPHTHALMIC LENSES HAVING RESIDUAL REFLECTIONS EXHIBITING COLORS OF DIFFERENT INTENSITY

(75) Inventors: Francisco De Ayguavives, Charenton-le-Pont (FR); Berangere Penaud, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/813,760

(22) PCT Filed: Jan. 5, 2007

(86) PCT No.: PCT/FR2007/050618

§ 371 (c)(1),
(2), (4) Date: Jul. 11, 2007

(87) PCT Pub. No.: WO2007/080342

PCT Pub. Date: Jul. 19, 2007

(65) Prior Publication Data

US 2008/0084535 A1    Apr. 10, 2008

(30) Foreign Application Priority Data

Jan. 12, 2006   (FR) .................................. 06 50115

(51) Int. Cl.
*G02C 7/10* (2006.01)

(52) U.S. Cl. ........................................ 351/163; 351/44
(58) Field of Classification Search .................. 351/44, 351/45, 163, 164, 165
See application file for complete search history.

(56) References Cited

U.S. PATENT DOCUMENTS

| 3,799,653 A | 3/1974 | Ikeda .......................... 359/588 |
| 4,609,267 A | 9/1986 | Deguchi et al. ............. 351/163 |
| 6,777,069 B2 * | 8/2004 | Ito et al. ................... 428/322.2 |

FOREIGN PATENT DOCUMENTS

| EP | 0928977 | 7/1999 |
| FR | 2182079 | 12/1973 |

* cited by examiner

*Primary Examiner*—Scott J Sugarman
(74) *Attorney, Agent, or Firm*—Fulbright & Jaworski, L.L.P.

(57) ABSTRACT

Each lens of a pair of lenses is provided on at least one of its faces with an antireflection coating having a luminous reflection factor $R_v$ that is 2.5% or less, having residual reflections exhibiting the same perceived color, the hue angle (h) for the antireflection coating of one lens varying by not more than 60° as compared to the antireflection coating of the other lens, and:
 the antireflection coating of one of the lens having an intensely colored residual reflection, a mean reflection factor $R_m1 \geq 1.20\%$ and a chroma value $C^*1 \geq 15$,
 the antireflection coating of the second lens having a weakly colored residual reflection, a mean reflection factor $R_m2 \leq 1.65\%$ and a chroma value $C^*2 \leq 15$, and $|R_m1-R_m2| \leq 2.2\%$ and $C^*1-C^*2 > 5$.

The invention can be applied to spectacle glasses.

37 Claims, 2 Drawing Sheets

COLLECTION OF OPHTHALMIC LENS PAIRS AND OPHTHALMIC LENSES HAVING RESIDUAL REFLECTIONS EXHIBITING COLORS OF DIFFERENT INTENSITY

This application is a national phase application under 35 U.S.C. § 371 of International Application No. PCT/FR2007/050618 filed Jan. 5, 2007, which claims priority to French Application No. 0650115 filed Jan. 12, 2006. The entire text of each of the above-referenced disclosures is specifically incorporated herein by reference without disclaimer.

BACKGROUND OF THE INVENTION

1. Field of the Invention

This invention generally relates to a collection made of pairs of ophthalmic lenses, wherein each lens within said pair comprises at least one antireflection coating having the same perceived chromatic colour of residual reflected light but with a different colour intensity.

This invention also relates to ophthalmic lenses that are provided on their front and rear faces with an antireflection coating which perceived chromatic colour of the residual reflection has a different colour intensity.

2. Description of Related Art

It is usual to apply antireflection coatings to ophthalmic lenses so as to reduce the mean reflection factor.

In this way, the lens wearer's look is made clearer for an observer and the wear comfort is improved for the wearer.

Antireflection coatings most often have a residual colour.

This residual colour is perceived by the person who is facing the lens wearer.

Each ophthalmic lens provided with an antireflection property commercially available under a given trademark has a residual colour which is characteristic of it and the reproducibility of which must be ensured by the manufacturer so as the perceived colour to be substantially the same from one lens to the other, that is to say two lenses resulting from the same industrial process cannot be discriminated between each other and their residual reflections are considered by an observer as being identical.

This residual colour is generally comprised in the green range but other colours such as yellow (gold) or purple are also frequently encountered.

As regards the new lens generations provided with an antireflection property, the general trend does consist in lowering the chroma value so as to make the glass more neutral, that is to say so as to minimize the colour perception.

Recently, it was proposed a range of glasses provided with an antireflection property and having a residual reflection of different colours, notably emerald, amethyst, amber and ruby, to combine with the ophthalmic lens basic hues so as to obtain a cosmetic effect matching-up with the frame.

These colours belong to very varied areas of the spectral range, that is to say having very different hue angles h within the CIE colour-space L*, a*, b*.

This aim does assume the customer to be able to clearly identify the antireflection coating residual colour.

However it has been confirmed that some lenses belonging to this range do present a mean reflection factor $R_m \geq 4\%$ and a luminous reflection factor $Rv \geq 3\%$, and even $\geq 4\%$, which explains that such lenses cannot be truly considered as anti-reflecting lenses, since a glass provided with an antireflection property must have a luminous reflection factor per face that is 2.5% or less.

SUMMARY OF THE INVENTION

It is a first object of the invention to extend the range of antireflection glasses having a coloured residual reflection as proposed to the customer.

It is a second object of the present invention to provide the customer with an additional criterion for selecting such antireflection lenses having a coloured residual reflection.

After having conducted extensive researches, the present inventors finally concluded that the eye of an observer, despite the low intensity of the residual reflection of a lens provided with an antireflection coating, could distinctly distinguish, for the same given residual reflection chromatic colour, colour intensities that do differ according to the nature of the antireflection coatings submitted to his appreciation and that such distinction could be obtained for most of the visible spectrum colours.

According to one of the main characteristics of the invention, the applicants did determine that to provide a colour intense perception, the antireflection coating mean reflection factor should not be excessively raised.

There are indeed two antagonistic phenomena: that of the perception of the reflection luminosity and that of the colour perception.

Increasing the antireflection coating reflection factor may indeed result in the residual reflection be perceived as being more luminous but the colour perception as a consequence will be significantly reduced, so that the residual reflection will then not be perceived as being more strongly coloured.

To achieve the objectives of the present invention, it should thus be proceeded within defined reflection factor and chroma value ranges and on the other side, the gap should be limited between the reflection factor of the antireflection coating with a low intensity residual colour and that of the antireflection coating with a high intensity residual colour.

Surprisingly, this distinction phenomenon is amplified in some colour ranges when the luminous reflection factor of the high intensity residual colour coating is lower than the light reflection factor of the low intensity residual colour antireflection coating.

According to the present invention, the above mentioned objectives are aimed at by means of an ophthalmic lens pair collection, each lens of which, within said same pair, comprising a substrate having a front face and a rear face, and which is provided on its front face and/or rear face with an antireflection coating having a luminous reflection factor $R_v \leq 2.5\%$, being preferably 2% or less, said antireflection coatings exhibiting residual reflections having the same perceived chromatic colour, the hue angle h of the antireflection coating of one paired lens varying by not more than 60°, preferably by not more than 45° as compared to the hue angle (h) of the antireflection coating of the other paired lens, and a) the antireflection coating of the first paired lens having a residual reflection exhibiting a high intensity colour with following characteristics:
  a mean reflection factor $R_m 1 \geq 1.20\%$, preferably $\geq 1.30\%$, more preferably $\geq 1.35\%$, and even more preferably $\geq 1.40\%$;
  a chroma value $C^*1 \geq 15$, preferably $\geq 17$;

b) the antireflection coating of the second paired lens having a residual reflection exhibiting a low intensity colour with following characteristics:
  a mean reflection factor $R_m 2 \leq 1.65\%$, preferably $\leq 1.60\%$, more preferably $\leq 1.50\%$;
  a chroma value $C^*2 \leq 15$, preferably $\leq 14$, more preferably $\leq 12$ and even more preferably $\leq 10$;

c) the difference, in absolute value, between $R_m1$ and $R_m2$ does satisfy the relation $|R_m1-R_m2|\leq 2.2\%$, preferably $\leq 2\%$, more preferably $\leq 1.8\%$, even more preferably 1.50%, and most preferably $\leq 1.30\%$;

d) the difference $C^*1-C^*2$ does satisfy the relation $C^*1-C^*2>5$, preferably $>6$ and more preferably $>6.5$, and preferably $C^*1-C^*2<25$.

The luminous reflection factor (which takes the spectral relative light efficiency function of the eye into account) and the mean reflection factor, as well as the light transmission factor in the visible spectrum to which reference is made in the present application, as well as the measuring methods thereof are as defined in the ISO 8980-4 standard (2000-06-01).

The calorimetric characteristics (chroma value, hue angle) in the whole application are as defined in the CIE 1976 Lab system, with observer 10° and illuminant D65.

As used therein, the "perceived chromatic colour" does mean a colour that is perceived as possessing a chromatic tone.

The chromatic tone (or hue) represents the visual sensation attribute which has resulted in colour denominations such as blue, green, yellow, red, purple, and so on.

An example of colours perceived as possessing the same chromatic tone is given in the Munsell atlas. The Munsell atlas does define ten (10) main hue sectors (of 32°) produced from blue (B), green (G), yellow (Y), red (R) and purple (P) as indicated in FIG. 2.

As used in the context of the present invention, a "same perceived chromatic colour" does correspond to a chromatic colour that is perceived as having an identical chromatic tone.

In the context of the present invention, a same perceived chromatic colour is preferably considered as being a colour that may be comprised in two consecutive sectors within the Munsell diagram as long as the difference between the hue angle (h) of both colours is not more than 60°, preferably not more than 45°. It is also preferred according to the invention that same perceived chromatic colours are colours belonging to a same main hue sector in the Munsell colour system.

Preferably, for a hue angle (h) ranging from 220° to 300° and a hue angle (h) ranging from 310° to 30°, the antireflection coating luminous reflection factor $R_v1$ for the first paired lens (coating with a strong residual colour) and the antireflection coating luminous reflection factor $R_v2$ for the second paired lens (coating with a low residual colour) are such as $R_v1<R_v2$.

This invention also relates to a display pack for a collection of ophthalmic lens pairs comprising at least one pair of lenses such as those defined hereinabove and a carrier in which the lenses of each pair are placed side by side either in the form of a row or in the form of a column.

This invention also relates to an ophthalmic lens comprising an optically transparent substrate, at least partly tinted, having a front face and a rear face, the front face being provided with a first antireflection coating and the rear face being provided with a second antireflection coating, said antireflection coatings having a luminous reflection factor $R_v \leq 2.5\%$, that is preferably 2% or less and having a residual reflection exhibiting a perceived chromatic colour, wherein:

the first antireflection coating has a residual reflection exhibiting a perceived chromatic colour of high intensity, a mean reflection factor satisfying the relation 2.5%, more preferably $2\% \geq R_m1 \geq 1.20\%$, preferably 2.5%, more preferably $2\% \geq R_m1 \geq 1.30\%$, more preferably 2.5%, even more preferably $2\% \geq R_m1 \geq 1.35\%$; and most preferably 2.5%, more preferably $2\% \geq R_m1 \geq 1.40\%$ and a chroma value $C^*1 \geq 15$, preferably $\geq 17$, the second antireflection coating has a residual reflection exhibiting a perceived chromatic colour of low intensity, a mean reflection factor $R_m2$ lower than the mean reflection factor $R_m1$ for the first antireflection coating, $R_m2$ being preferably $\leq 1.65\%$, very preferably $\leq 1.60\%$, more preferably $\leq 1.50\%$, even more preferably $\leq 1\%$, even more preferably $\leq 0.6\%$ and most preferably $\leq 0.5\%$ and a chroma value $C^*2 \leq 15$, preferably $\leq 14$, more preferably $\leq 12$ and even more preferably $\leq 10$, the mean reflection factors for the first and second antireflection coatings do satisfy the relation $|R_m1-R_m2|\leq 2.2\%$, preferably $\leq 2\%$, more preferably $\leq 1.8\%$, even more preferably 1.50%, and most preferably $\leq 1.30\%$, and the chroma values for the first and second antireflection coatings do satisfy the relation $C^*1-C^*2>5$, preferably $C^*1-C^*2>6$, more preferably $C^*1-C^*2>6.5$, and preferably $C^*1-C^*2<25$.

BRIEF DESCRIPTION OF THE DRAWINGS

The description that follows does refer to the appended figures which illustrate.

DETAILED DESCRIPTION OF THE INVENTION

As used herein, an at least partly tinted substrate means a substrate, preferably an ophthalmic lens, which light transmission factor in the visible spectrum is lower than 90%, preferably lower than 85%, more preferably lower than 70%, even more preferably lower than 40% and most preferably lower than 20%.

Generally speaking, it is preferred that the substrate be either mass-tinted, or be tinted by means of a pigment layer that was made to penetrate the substrate surface or also thanks to visible light absorbing coatings (primer, abrasion-resistant coating, antireflection coating) provided on the front face of the substrate, that is to say on the convex face in the case of an ophthalmic lens.

Preferably, the visible light absorption due to the substrate and/or the absorbing coatings applied to the front face of the substrate is 10% or more, more preferably 20% or more, and even more preferably 40% or more.

The first and second antireflection coatings of the ophthalmic lens may have residual reflections exhibiting different perceived chromatic colours but the residual reflections will preferably have the same perceived chromatic colours.

When both antireflection coatings of the ophthalmic lens have residual reflections exhibiting the same perceived chromatic colours, the hue angle (h) for one of both coatings does not vary by more than 60°, preferably by more than 45° as compared to the hue angle (h) of the other coating.

The ophthalmic lenses of the invention are preferably spectacle glasses.

As used in the present description as well as in the appended claims, the front face of a substrate or of a lens means that face which in use does stand the farthest from the user's eye. On the contrary, the rear face of the substrate or of the lens is that face which in use does stand the closest to the user's eye.

Figure 1:
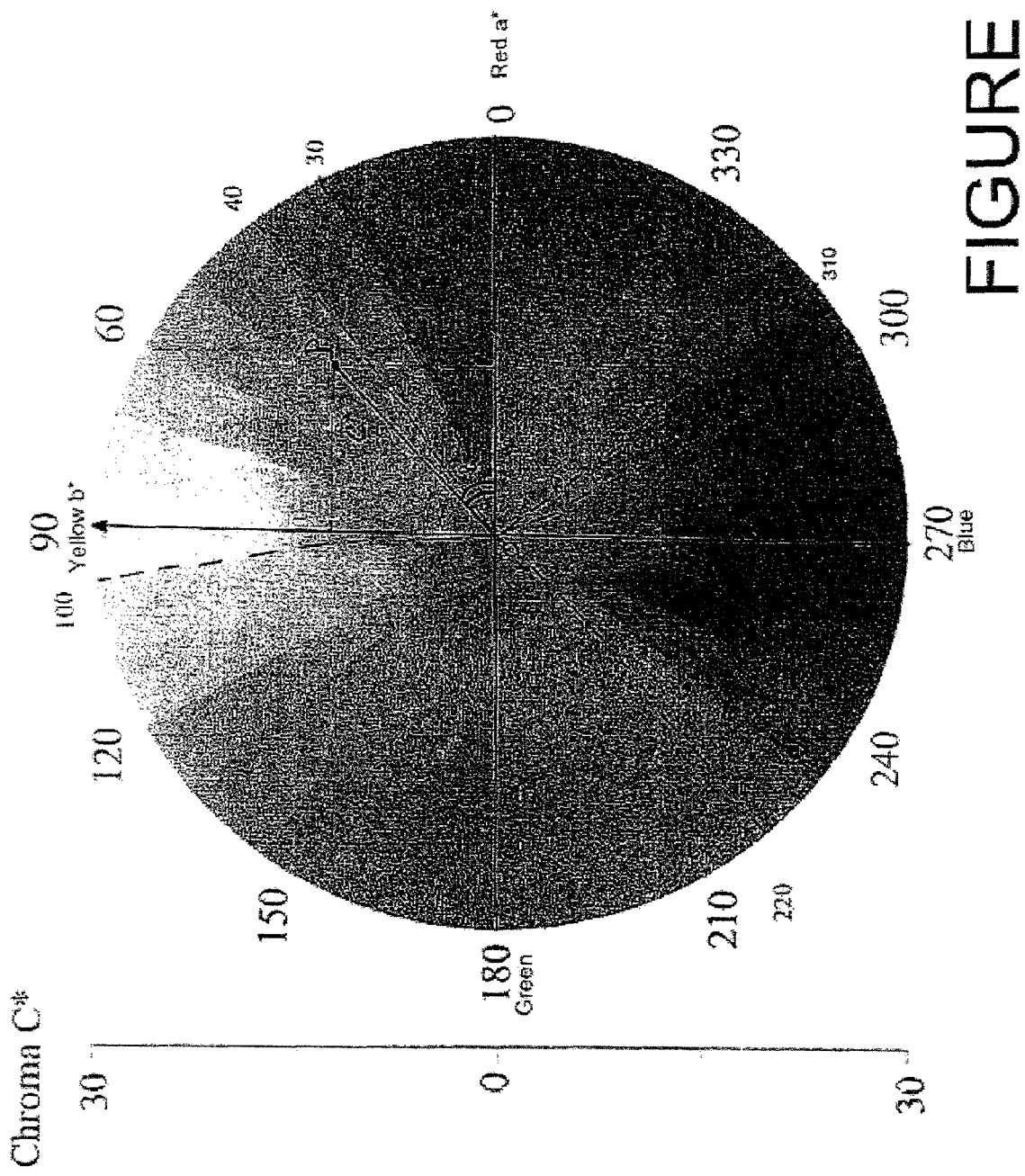
in FIG. 1, an illustration of the CIE colour-measuring system $L^*a^*,b^*$; and in FIG. 2, the Munsell diagram with the ten main hue sectors.
Figure 2:
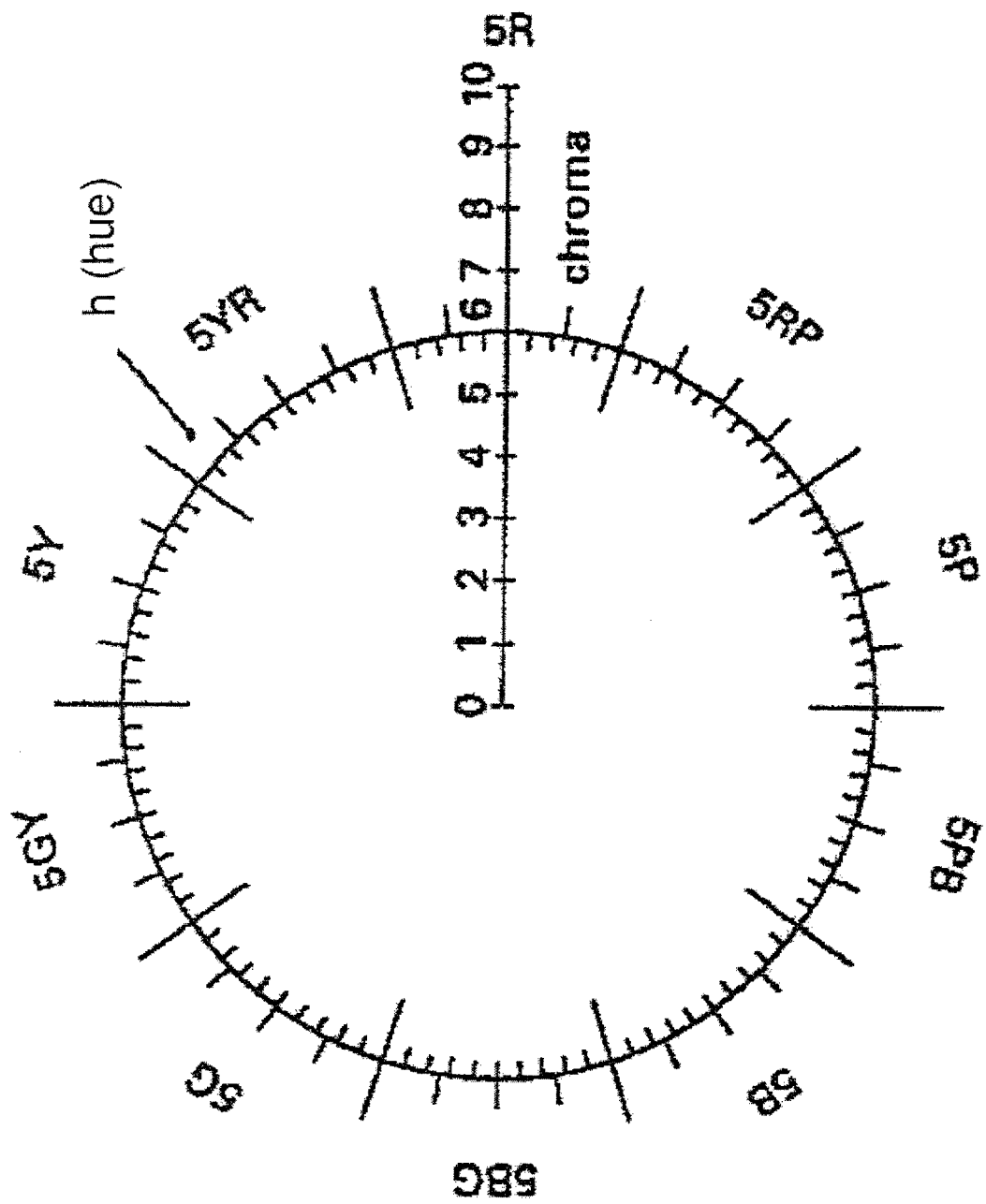

In reference to FIG. 1, a colour is defined by a P point of coordinates $a^*$ (for measuring the red to green shift), $b^*$ (for measuring the yellow to blue shift), the hue angle (h) which corresponds to the angle of the segment OP with the a* axis, and the chroma value (or saturation) C* which corresponds to the OP segment length.

The hue angle (h) does express the colour perception and the chroma value C* does express the chromatic purity sensation, that is to say the position on the colour scale extending from black to "achromatic" white i.e. without any colour tone, up to the saturated "monochromatic" colour, having a totally pure colour tone.

The collection of ophthalmic lens pairs according to the invention is generally characterized by the fact that within the same lens pair each lens comprising a substrate having a front face and a rear face is provided on its front face and/or on its rear face with an antireflection coating, that is to say a coating having a luminous reflection factor Rv≦2.5%, that is preferably 2% or less, with residual reflections having the same perceived chromatic colour which as regards the colorimetric parameter choice criteria for the antireflection coatings is perceived by an observer, for one of the paired lenses, as having a low colour intensity (weakly coloured), and for the other one of the paired lenses, as having a high colour intensity (strongly coloured).

Thus, to obtain the expected effect, the colorimetric parameters for the antireflection coatings must satisfy following conditions:

the intensely coloured antireflection coating must have a mean reflection factor $R_m1 \geq 1.20\%$, preferably $\geq 1.30$, more preferably $\geq 1.35\%$, and even more preferably $\geq 1.40\%$ and a chroma value $C^*1 \geq 15$, preferably $\geq 17$;

the weakly coloured antireflection coating must have a mean reflection factor $R_m2 \leq 1.65\%$, preferably $\leq 1.60\%$, more preferably $\leq 1.50\%$ and a chroma value $C^*2 \leq 15$, preferably $\leq 14$, more preferably $\leq 12$ and even more preferably $\leq 10$;

the difference in absolute value between the mean reflection factor $R_m1$ value of the intensely coloured antireflection coating and the mean reflection factor $R_m2$ value of the weakly coloured antireflection coating must satisfy the relation $|R_m1 - R_m2| \leq 1.30\%$;

the difference between the chroma values of the intensely coloured antireflection coating and of the weakly coloured antireflection coating must satisfy the relation $C^*1 - C^*2 > 5$, preferably >6 and more preferably >6.5; and the hue angle (h) of the antireflection coating of one paired lens should not vary by more than 60°, preferably by more than 45° as compared to the hue angle (h) of the antireflection coating of the other paired lens.

Also preferably the difference between the chroma value of the intensely coloured antireflection coating and that of the weakly coloured antireflection coating does satisfy the relation $C^*1 - C^*2 < 25$.

It has surprisingly been discovered that for h values ranging from 220° to 300° and from 310° to 30°, the distinction phenomenon between a weak coloration and a strong coloration is amplified if the luminous reflection factor $R_v1$ of the antireflection coating with the intense residual colour is lower than the luminous reflection factor $R_v2$ of the antireflection coating with the weak residual colour.

Thus preferably for the antireflection coating h values ranging from 220° to 300° (blue coloured) and from 310° to 30° (pink coloured), the luminous reflection factor $R_v1$ of the antireflection coating having an intense residual colour is lower than the visible luminous reflection factor $R_v2$ of the antireflection coating having a weak residual colour.

In one embodiment, the ophthalmic lens collection does comprise at least 3 pairs of lenses, a first yellow-coloured pair of lenses which hue angle (h) varies from 40° to 100°, preferably from 40 to 90°, a second blue-coloured pair of lenses which hue angle (h) varies from 220° to 300°, preferably from 220° to 280° and a pink-coloured pair of lenses which hue angle (h) varies from 310° to 30°.

Preferably, the hue angle (h) of the yellow-coloured pair of lenses is centred on about 70° and the hue angle (h) of the pink-coloured pair of lenses is centred on about 360°.

As is well known, the suitable antireflection coatings to be used in the present invention do consist in a stacking of dielectric material alternating layers having either a high refractive index ($n_D^{25} \geq 1.50$) or a low refractive index ($n_D^{25} < 1.50$).

Preferably, the layers of the antireflection stack comprise dielectric materials such as SiO, $SiO_2$, $Si_3N_4$, $TiO_2$, $ZrO_2$, $Al_2O_3$, $MgF_2$ or $Ta_2O_5$, or mixtures of such compounds. More preferably, low refractive index layers are formed of $SiO_2$ and high refractive index layers are formed of $ZrO_2$.

The antireflection coatings do preferably comprise the same number of layers and more preferably comprise 4 layers. In a particularly preferred embodiment, the antireflection coatings do comprise, starting from the face of the substrate, a first, high refractive index $ZrO_2$ layer, a second, low refractive index $SiO_2$ layer, a third, high refractive index $ZrO_2$ layer and a fourth, low refractive index $SiO_2$ layer.

Usually the ratio (total physical thickness of the low refractive index layers)/(total physical thickness of the high refractive index layers) ranges from 0.6 to 1.2.

Also preferably, the antireflection coating comprises an adhesion sub-layer, for example a $SiO_2$ adhesion sub-layer, between the stack of high and low refractive index alternating layers and the surface of the substrate.

Such adhesion sub-layer is in general 50 to 250 nm thick.

The methods for depositing the antireflection coating layers may be any method known, such as vapour deposition, optionally ion beam assisted vapour deposition, ion beam sputtering, cathode sputtering or plasma assisted chemical vapour deposition.

Depositing the antireflection coatings is preferably conducted by high pressure cathode sputtering.

The substrate may be any substrate that is ordinary used for making ophthalmic lenses, especially for making spectacle glasses, and may be a mineral glass or an organic glass, preferably an organic glass.

The most preferred substrates include polymeric material containing substrates based on diethyleneglycol bis(allylcarbonate) (CR39® PPG), on poly(meth)acrylate, on polythio (meth)acrylate, on polyurethane, on polythiourethane, on polyepoxy, on polyepisulfide, on polycarbonate and mixtures thereof.

The antireflection coatings may be deposited onto bare substrates, that is to say substrates the faces of which are not provided with any coating, or onto substrates that have been previously coated, that is to say substrates, the faces of which are provided with one or more functional coating(s).

These functional coatings are well known and they may comprise as an example a primer so as to improve adhesion and/or impact resistance, an abrasion-resistant coating, a polarizing coating, a photochromic coating.

Suitable impact resistant primers include for example methacrylate- and polyurethane-based coatings.

(Meth)acrylate-based impact resistant coatings include inter alia those described in the American patent U.S. Pat. No. 5,015,523, whereas coatings based on thermoplastic and crosslinked polyurethane resin are described inter alia in both Japanese patents 63-141001 and 63-87223, in EP 0404111 and in U.S. Pat. No. 5,316,791.

Preferred impact resistant primer coatings are those based on a latex composition such as a poly(meth)acrylic latex, a polyurethane latex or a polyester latex.

As preferred (meth)acrylate-based impact resistant primer coatings, materials based on polyethylene glycol (meth)acrylate may be mentioned such as, for example, tetraethylene glycol diacrylate, polyethylene glycol(200) diacrylate, polyethylene glycol(400) diacrylate, polyethylene glycol(600) di(meth)acrylate, as well as (meth)acrylate urethanes and mixtures thereof.

Preferred impact resistant primer coating compositions also include acrylic type latexes marketed under the trade name acrylic latex A-639 by ZENECA and polyurethane type latexes marketed under the trade names W-240 and W-234 by BAXENDEN.

As preferred abrasion resistant coatings, those may be mentioned that are produced by curing a composition comprising epoxyalkoxysilanes or a hydrolysate thereof with an acid and a curing agent.

Examples of such compositions are given in the American patents U.S. Pat. No. 4,211,823, U.S. Pat. No. 5,015,523 and in the international application WO 94/10230.

Preferred abrasion-resistant coating compositions are those comprising as main components an epoxyalkoxysilane such as for example γ-glycidoxypropyl trimethoxysilane and a dialkyl dialkoxysilane such as for example, dimethyl diethoxysilane, colloidal silica and a curing catalyst in catalytic amount such as an aluminium acetylacetonate or a hydrolysate thereof, the rest of the composition mainly consisting in solvents such as traditionally used for their formulation.

The substrates may be uncoloured substrates or mass-tinted substrates.

Antireflection coatings may themselves also be coated with an anti-fouling coating such as a hydrophobic and/or an oleophobic coating.

Such anti-fouling coatings are also well known in the art and do traditionally comprise fluorosilicone or fluorosilazane, that is to say silicones or silazanes comprising fluorine-containing groups.

The product marketed by SHIN-ETSU under the trade name KP 801 M® represents an example of such a preferred material.

The so called Optool DSX® product marketed by Daikin may be used as well.

As an example, characteristics of 3 lens pairs of the invention are listed in the hereunder table 1, which residual reflection colour is blue, yellow and pink, respectively.

TABLE 1

Antireflection coating with a weakly coloured residual reflection

| Colour of the residual reflection | Layer stack from the substrate (thickness in nm) | h(°) | C*2 | $R_m2$ (%) | $R_v2$ (%) |
|---|---|---|---|---|---|
| Pink | $ZrO_2$ (21), $SiO_2$ (14) $ZrO_2$ (79), $SiO_2$ (76) | 5 | 9.5 | 1.5 | 0.9 |
| Yellow (gold) | $ZrO_2$ (16), $SiO_2$ (20) $ZrO_2$ (106), $SiO_2$ (72) | 76 | 9 | 1.0 | 0.9 |
| Blue | $ZrO_2$ (14), $SiO_2$ (20) $ZrO_2$ (112), $SiO_2$ (91) | 287 | 7.5 | 0.65 | 0.4 |

Antireflection coating with an intensely coloured residual reflection

| Colour of the residual reflection | Layer stack from the substrate (thickness in nm) | h(°) | C*1 | $R_m1$ (%) | $R_v1$ (%) |
|---|---|---|---|---|---|
| Pink | $ZrO_2$ (12), $SiO_2$ (12) $ZrO_2$ (88), $SiO_2$ (76) | 355 | 18.5 | 1.5 | 0.7 |
| Yellow | $ZrO_2$ (19), $SiO_2$ (28) $ZrO_2$ (101), $SiO_2$ (69) | 71 | 20 | 2.0 | 2.0 |
| Blue | $ZrO_2$ (15), $SiO_2$ (34) $ZrO_2$ (108), $SiO_2$ (98) | 282 | 30 | 1.9 | 0.8 |

Inspection Test of the Ophthalmic Lens Pairs According to the Invention

This test consists for panel members in visually examining pairs of ophthalmic lenses of the invention so as to determine whether the colour intensity differences within a same pair of lenses that are appreciated as having residual reflections exhibiting the same perceived chromatic colour can be clearly and immediately identified.

Visual Inspection Principles

For each test, 3 identically sized lens samples of the invention were placed side by side in direct contact, amongst which two samples had an intensely coloured residual reflection and the third lens sample had a weakly coloured residual reflection, or vice versa.

The 3 samples were placed in a light test cabinet (intensity of illumination 1000 Lux, standard source reproducing illuminants D65).

The cabinet background was neutral grey with a lightness L*=50 (CIE recommendation).

The 3 samples were observed at a distance of 50 cm and at a viewing angle of 15°.

Tested Samples

The test was conducted on a series of 3 samples.

a first series of samples comprised 3 ophthalmic lenses of the invention with a blue residual reflection colour, two of them having an intensely coloured residual reflection and/or a weakly coloured residual reflection, the third lens having an intensely or a weakly coloured residual reflection, depending on the case;

a second series of samples comprised 3 ophthalmic lenses of the invention with a pink residual reflection colour, two of them having an intensely coloured residual reflected light, the third lens having a weakly coloured residual reflection, and a third series of samples comprised 3 ophthalmic lenses of the invention with a yellow (gold) residual reflection colour, two of them having a weakly coloured residual reflection and the third lens having an intensely coloured residual reflection.

The calorimetric characteristics for the three series of samples are indicated in following table II.

The reflection factors were measured according to the ISO8980-4 standard. The angle of incidence was 15°.

The reference color space used was CIE 1976 LAB, with observer 10° and illuminant D65.

TABLE II

| Series | Sample | h° | C* | Rm(%) | Rv(%) |
|---|---|---|---|---|---|
| 1 | intensive blue n°1 | 250 | 18 | 1.3 | 0.9 |
|  | intensive blue n°2 | 249 | 18.8 | 1.37 | 1 |
|  | Weak blue | 242 | 12 | 0.88 | 0.70 |
| 2 | intensive pink n°1 | 345 | 17.3 | 1.37 | 0.6 |
|  | intensive pink n°2 | 345 | 17.4 | 1.39 | 0.6 |
|  | Weak pink | 4.3 | 10.8 | 1.38 | 0.8 |

TABLE II-continued

| Series | Sample | h° | C* | Rm(%) | Rv(%) |
|---|---|---|---|---|---|
| 3 | intensive yellow | 70.3 | 20.4 | 2.18 | 2.09 |
|   | Weak yellow n°1 | 85 | 13.6 | 1.44 | 1.38 |
|   | Weak yellow n°2 | 84 | 13.4 | 1.57 | 1.47 |

Each series comprised two intensely or weakly coloured samples and an intensely coloured sample if the two other samples were weakly coloured or a weakly coloured sample if the two other samples were intensely coloured, so that it can be considered that the visual inspection was conducted on 2 pairs of lenses for each test, for example intensive blue n° 1/weak blue and intensive blue n° 2/weak blue for the series 1.

Panel Members and Asked Questions

There were 14 panel members, 10 of them being experimented in examining antireflection lenses and 4 of them being newcomers.

Each panel member was asked following questions:

question #1: amongst the 3 samples of the series did you think there was a different sample?

question #2: amongst the 3 samples of the series which do you think does or do have the most intense colour?

question #3: do you think that for each series the 3 samples do belong to the same range of chromatic tone (perceived chromatic colour).

Test Results:

To the question #1, 100% of the panel members answered that:
the weak blue sample strongly differed from the two others;
the weak pink sample strongly differed from the two others;
the intensive yellow sample strongly differed from the two others.

To the question #2, 100% of the panel members answered that:
the two intensive blue samples had the most intense colour;
the two intensive pink samples had the most intense colour;
the two weak yellow samples had the weakest colour intensity.

to the question #3, 100% of the panel members answered "yes" for the 3 series of samples.

To conclude, the test demonstrated that for pairs of lenses according to the invention which are perceived as having a same chromatic tone, the difference between an intensely coloured lens and a weakly coloured lens is made systematically and instantaneously.

The invention claimed is:

1. A collection of ophthalmic lens pairs, each lens of which, within said same pair, comprise a substrate having a front face and a rear face and on the front face and/or rear face an antireflection coating having a luminous reflection factor $R_v$ that is 2.5% or less, said antireflection coating exhibiting residual reflections having the same perceived chromatic color, the hue angle (h) of the antireflection coating of one paired lens varying by not more than 60° as compared to the hue angle h of the antireflection coating of the other paired lens and:

a) the antireflection coating of the first paired lens having a residual reflection exhibiting a high intensity color with:
    a mean reflection factor $R_m1$ that is 1.20% or more; and
    a chroma value $C*1$ of 15 or more;

b) the antireflection coating of the second paired lens having a residual reflection exhibiting a low intensity color with:
    a mean reflection factor $R_m2$ that is 1.65% or less; and
    a chroma value $C*2$ of 15 or less;

c) the mean reflection factors for the antireflection coatings satisfy the relation $|R_m1-R_m2| \leq 2.2\%$; and d) $C*1-C*2>5$.

2. The collection of claim 1, wherein the luminous reflection factor $R_v$ is 2% or less.

3. The collection of claim 1, wherein the hue angle (h) of the antireflection coating of one paired lens varies by not more than 45° as compared to the hue angle h of the antireflection coating of the other paired lens.

4. The collection of claim 1, wherein $R_m1$ is 1.20% or more.

5. The collection of claim 4, wherein $R_m1$ is 1.30% or more.

6. The collection of claim 5, wherein $R_m1$ is 1.35% or more.

7. The collection of claim 6, wherein $R_m1$ is 1.40% or more.

8. The collection of claim 1, wherein $C*1$ is 17 or more.

9. The collection of claim 1, wherein $R_m2$ is 1.65% or less.

10. The collection of claim 9, wherein $R_m2$ is 1.60% or less.

11. The collection of claim 10, wherein $R_m2$ is 1.50% or less.

12. The collection of claim 1, wherein $C*2$ is 14 or less.

13. The collection of claim 12, wherein $C*2$ is 12 or less.

14. The collection of claim 13, wherein $C*2$ is 10 or less.

15. The collection of claim 1, wherein $|Rm1-Rm2| \leq 2\%$.

16. The collection of claim 15, wherein $|Rm1-Rm2| \leq 1.8\%$.

17. The collection of claim 16, wherein $|Rm1-Rm2| \leq 1.5\%$.

18. The collection of claim 17, wherein $|Rm1-Rm2| \leq 1.3\%$.

19. The collection of claim 1, wherein $C*1-C*2>6$.

20. The collection of claim 19, wherein $C*1-C*2>6.5$.

21. The collection of claim 20, wherein $C*1-C*2$ is >25.

22. The collection of claim 1, wherein for a hue angle (h) ranging from 220° to 300° or for a hue angle (h) ranging from 310° to 30°, the luminous reflection factor $R_v1$ for the antireflection coating having a residual reflection exhibiting a high intensity color is lower than the luminous reflection factor $R_v2$ for the antireflection coating having a residual reflection exhibiting low intensity color.

23. The collection of claim 1, further defined as comprising at least 3 pairs of lenses further defined as:
    a first pair of lenses having a residual reflection which perceived chromatic color is yellow and which hue angle (h) ranges from 40° to 100°;
    a second pair of lenses having a residual reflection which perceived chromatic color is blue and which hue angle (h) ranges from 220° to 300°; and
    a third pair of lenses having a residual reflection which perceived chromatic color is pink and which hue angle (h) ranges from 310° to 30°.

24. The collection of claim 23, wherein the first pair of lenses has a hue angle (h) ranging from 40° to 90°.

25. The collection of claim 23, wherein the second pair of lenses has a hue angle (h) ranging from 220° to 280°.

26. The collection of claim 1, wherein the antireflection coatings comprise an alternated stack of layers of high refractive index dielectric materials ($n_D^{25} \geq 1.50$) and low refractive index dielectric materials ($n_D^{25} < 1.50$).

27. The collection of claim 26, wherein the material for the high refractive index layer is $ZrO_2$ and the material for the low refractive index layer is $SiO_2$.

28. The collection of claim 26, wherein the antireflection coatings comprise the same number of layers.

29. The collection of claim 28, wherein the antireflection coatings comprise 4 layers.

30. The collection of claim 26, wherein the ratio (total physical thickness of the low refractive index layers)/(total physical thickness of the high refractive index layers) is from 0.6 to 1.2.

31. The collection of claim 1, wherein the substrate comprises an antireflection coating on both front and rear faces.

32. The collection of claim 1, further defined as comprised in a display pack.

33. A display pack for a collection of ophthalmic lens pairs comprising at least one pair of lenses according to claim 1 comprising a carrier on which the lenses belonging to the pair are placed side by side as a row or as a column.

34. The display pack of claim 33, wherein the collection of ophthalmic lens pairs comprises at least 3 pairs of lenses, a first pair with a yellow residual reflection color, a second pair with a blue residual reflection color and a third pair with a pink residual reflection color.

35. An ophthalmic lens comprising a transparent and at least partly tinted substrate comprising a front face and a rear face, wherein:
- the front face of the substrate comprises a first antireflection coating having a luminous reflection factor $R_v1 \leq 2.5\%$, a residual reflection exhibiting a perceived chromatic color of high intensity, a mean reflection factor satisfying the relation $2.5\% \geq R_m1 \geq 1.20$, and a chroma value $C^*1 \geq 15$;
- the rear face of the substrate comprises a second antireflection coating having a luminous reflection factor $R_v2 < 2.5\%$, a residual reflection exhibiting a perceived chromatic color of low intensity, a mean reflection factor $R_m2$ lower than the mean reflection factor $R_m1$ for the first antireflection coating, and a chroma value $C^*2 \leq 15$;
- the mean reflection factors $R_m1$ and $R_m2$ for the first and second antireflection coatings satisfying the relation $|R_m1 - R_m2| \leq 2.20\%$; and
- the chroma values $C^*1$ and $C^*2$ for the first and second antireflection coatings satisfying the relation $C^*1 - C^*2 < 5$.

36. A collection of ophthalmic lens pairs comprising an ophthalmic lens of claim 35.

37. The collection of claim 36, further defined as comprised in a display pack.

\* \* \* \* \*

UNITED STATES PATENT AND TRADEMARK OFFICE
CERTIFICATE OF CORRECTION

PATENT NO. : 7,452,076 B2  Page 1 of 1
APPLICATION NO. : 11/813760
DATED : November 18, 2008
INVENTOR(S) : Francisco De Ayguavives et al.

It is certified that error appears in the above-identified patent and that said Letters Patent is hereby corrected as shown below:

In title page, item (*) Notice, lines 5-6, delete "This patent is subject to a terminal disclaimer.".

In claim 21, column 10, line 40, delete ">25" and insert --<25-- therefor.

In claim 35, column 12, line 21, delete "<5" and insert -->5-- therefor.

Signed and Sealed this

Seventh Day of April, 2009

JOHN DOLL
*Acting Director of the United States Patent and Trademark Office*